US012610191B2

(12) United States Patent
Zhou et al.

(10) Patent No.: US 12,610,191 B2
(45) Date of Patent: Apr. 21, 2026

(54) SPEAKER

(71) Applicant: AAC Microtech (Changzhou) Co., Ltd., Changzhou (CN)

(72) Inventors: Keyong Zhou, Changzhou (CN); Yuanxiang Mao, Changzhou (CN); Guofang Zhen, Changzhou (CN); Hao Yang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 160 days.

(21) Appl. No.: 18/764,346

(22) Filed: Jul. 4, 2024

(65) Prior Publication Data

US 2025/0287152 A1 Sep. 11, 2025

Related U.S. Application Data

(63) Continuation of application No. PCT/CN2024/080708, filed on Mar. 8, 2024.

(51) Int. Cl.

*H04R 9/04* (2006.01)
*H04R 7/12* (2006.01)
*H04R 7/20* (2006.01)
*H04R 9/02* (2006.01)

(52) U.S. Cl.

CPC ............... *H04R 7/20* (2013.01); *H04R 7/127* (2013.01); *H04R 9/025* (2013.01); *H04R 2400/11* (2013.01)

(58) Field of Classification Search

CPC ... H04R 7/02; H04R 7/04; H04R 7/06; H04R 7/127; H04R 7/16; H04R 7/18; H04R 9/02; H04R 9/025; H04R 9/04; H04R 9/041; H04R 9/043; H04R 9/045; H04R 2307/201

See application file for complete search history.

(56) References Cited

U.S. PATENT DOCUMENTS 9,813,818 B2 * 11/2017 Wu .......................... H04R 9/06

FOREIGN PATENT DOCUMENTS

WO WO-2022062115 A1 * 3/2022 ............ H04M 1/035

* cited by examiner

*Primary Examiner* — Ryan Robinson
(74) *Attorney, Agent, or Firm* — Wiersch Law Group

(57) ABSTRACT

A speaker includes a frame, a magnetic circuit system with a magnetic gap, and a vibration system, the vibration system includes a diaphragm assembly, a voice coil assembly, a first elastic wave assembly fixed, and a second elastic wave assembly, the diaphragm assembly includes a dome, a suspension, and a connecting wall extending from the dome to the voice coil assembly, the connecting wall includes a connecting portion connected with the dome the suspension, and a first suspension portion and a second suspension portion located at a side away from the dome, one end of the first elastic wave assembly away from the frame is connected with the first suspension portion, one end of the second elastic wave assembly away from the frame is connected with the second suspension portion. Compared with the related art, the speaker disclosed by the present disclosure could improve space utilization.

10 Claims, 5 Drawing Sheets

SPEAKER

FIELD OF THE INVENTION

The invention relates to the technical field of electro-acoustic transducers, in particular to speaker.

BACKGROUND

In the vehicle-mounted speaker industry, a traditional cone speaker is generally used. At present, the automobiles have higher requirements for high sound quality, flexible layout, low power consumption, and small vibration of speakers.

A vehicle-mounted speaker of the related art includes a frame, a vibration system fixed with the frame, and a magnetic circuit system with a magnetic gap. The magnetic circuit system drives the vibration system to vibrate and produce sounds, the vibration system includes a diaphragm fixed with the frame, and a voice coil assembly which is fixed with the diaphragm and inserted into the magnetic gap to drive the diaphragm to vibrate and produce sounds. However, this speaker has the problems of large structural size, low efficiency, and great low-frequency vibration.

Therefore, it is desired to provide a novel speaker to solve the above problems.

SUMMARY

The present disclosure is to provide an ultra-thin speaker that improves space utilization and has a well-balanced vibration system.

For achieving the object mentioned above, the disclosure provides a speaker comprising a frame, a magnetic circuit system with a magnetic gap, and a vibration system fixed with the frame, the vibration system includes a diaphragm assembly, a voice coil assembly driving the diaphragm assembly to vibrate and sound, a first elastic wave assembly fixed with the frame, and a second elastic wave assembly fixed with the frame and spaced apart from the first elastic wave assembly, the diaphragm assembly comprises a dome in a middle, a suspension surrounding the dome and fixed with the frame, and a connecting wall extending from the dome to the voice coil assembly, the connecting wall is integrally formed, the connecting wall comprises a connecting portion connected with the dome and the suspension, and a first suspension portion and a second suspension portion located at a side away from the dome, the first suspension portion and the second suspension portion are spaced apart from each other, one end of the first elastic wave assembly away from the frame is connected with the first suspension portion, one end of the second elastic wave assembly away from the frame is connected with the second suspension portion.

Further, the connecting portion is provided with an opening, the connecting portion is connected with the dome and the opening is covered by the dome, the first suspension portion and the second suspension portion are located symmetrically on opposite sides of the opening, respectively.

Further, the connecting wall further comprises a first fixing portion connected with the connecting portion and the first suspension portion, the first fixing portion comprises a first vertical segment extending from the connecting portion to the voice coil assembly and connected with the first suspension portion, and a first horizontal segment extending from the first vertical segment to the opening and connected with the connecting portion, a length of the first vertical segment is different from a length of the first horizontal segment.

Further, there is a plurality of first fixing portions, a first reinforce portion is formed between every two adjacent first fixing portions.

Further, the connecting wall further comprises a second fixing portion connected with the connecting portion and the second suspension portion, the second fixing portion comprises a second vertical segment extending from the connecting portion to the voice coil assembly and connected with the second suspension portion, and a second horizontal segment extending from the second vertical segment to the opening and connected with the connecting portion, a length of the second vertical segment is different from a length of the second horizontal segment.

Further, there is a plurality of second fixing portions, a second reinforce portion is formed between every two adjacent second fixing portions.

Further, the voice coil assembly comprises a square voice coil movably accommodated in the magnetic gap and a skeleton connected with the square voice coil and the diaphragm assembly, a first outlet portion and a second outlet portion are provided on a side of the skeleton away from the square voice coil, the first outlet portion and the second outlet portion are symmetrical.

Further, the speaker further comprises a first external pad and a second external pad embedded in the frame and connected with an external circuit, a first braided wire connected with the first external pad and the first outlet portion, and a second braided wire connected with the second external pad and the second outlet portion, the first braided wire and the second braided wire are located in the frame.

Further, the magnetic circuit system comprises a magnetic bowl, a magnet accommodated in the magnetic bowl, and a pole plate attached to the magnet, the square voice coil is movably accommodated in the magnetic gap between the pole plate and the magnetic bowl.

Further, the frame is arranged in a rectangular shape, the frame comprises a main body with a receiving cavity for accommodating the magnetic circuit system, a first mounting portion formed in the receiving cavity and located at one side of the main body, and a second mounting portion formed in the receiving cavity and located on the other side of the main body, the first elastic wave assembly is mounted on the first mounting portion, the second elastic wave assembly is mounted on the second mounting portion.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

Figure 1:
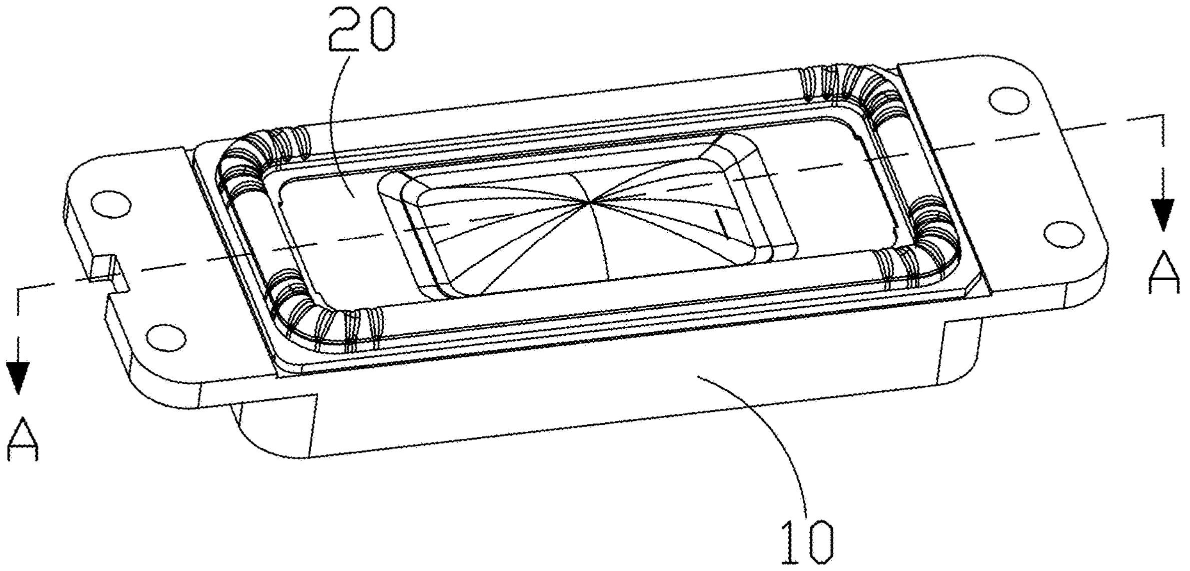
FIG. 1 is an isometric view of a speaker of the present disclosure.

The present disclosure will be further illustrated with reference to the accompanying drawings. It shall be noted that the elements of similar structures or functions are represented by like reference numerals throughout the figures. The embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

As shown in the FIGS. 1-4, the present invention discloses a speaker, which includes a frame 10, a vibration system 20, and a magnetic circuit system 30 with a magnetic gap 301. The magnetic circuit system 30 is used for driving the vibration system 20 vibrate and produce sounds. The vibration system 20 and the magnetic circuit system 30 are fixed with the frame 10.

As shown in the FIGS. 1-4, the vibration system 20 includes a diaphragm assembly 21 fixed with the frame 10 and a voice coil assembly 22 driving the diaphragm assembly 21 to vibrate and produce sounds.

Figure 2:
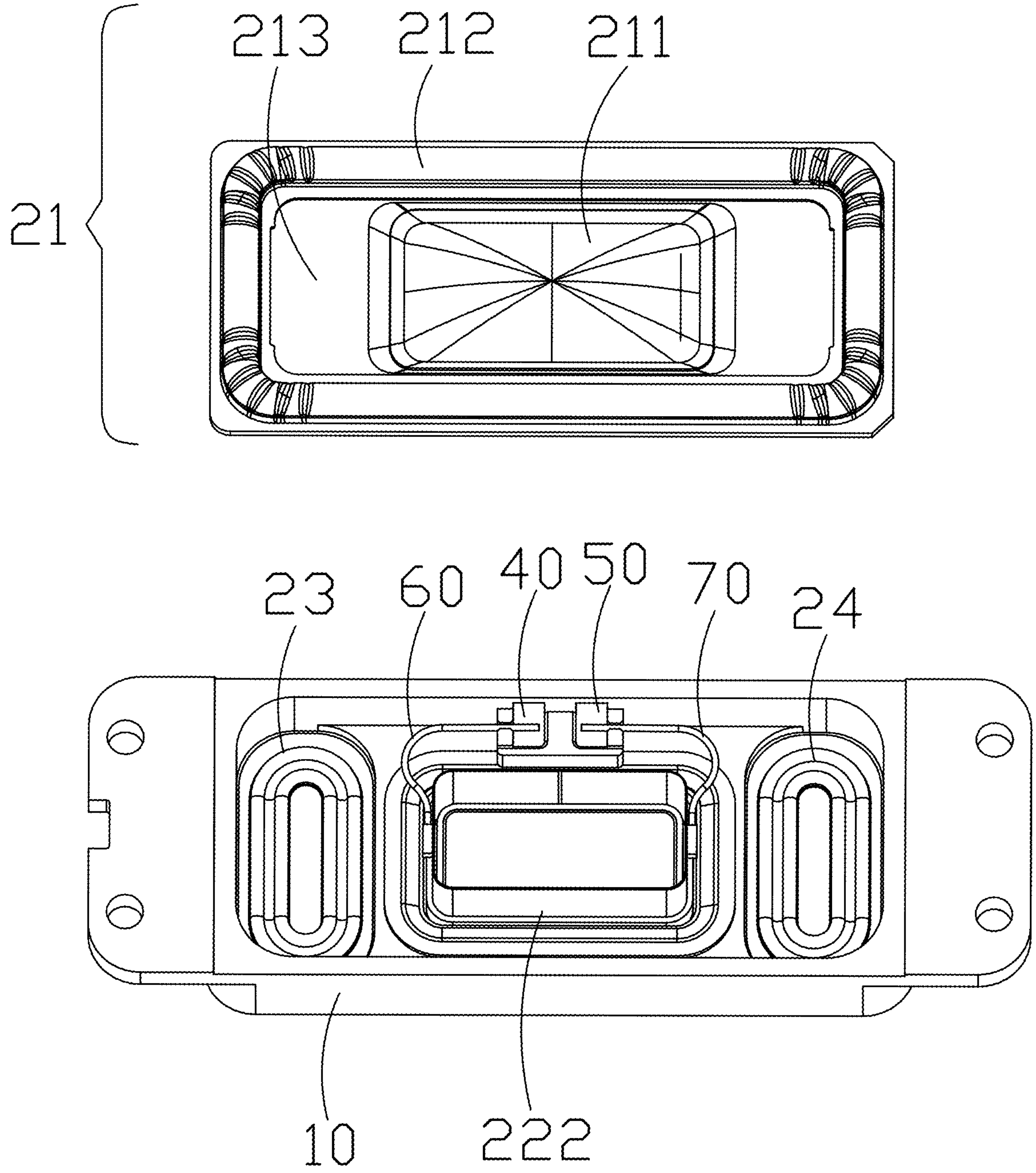
FIG. 2 is a partial isometric view of the speaker of the present disclosure.
Figure 3:
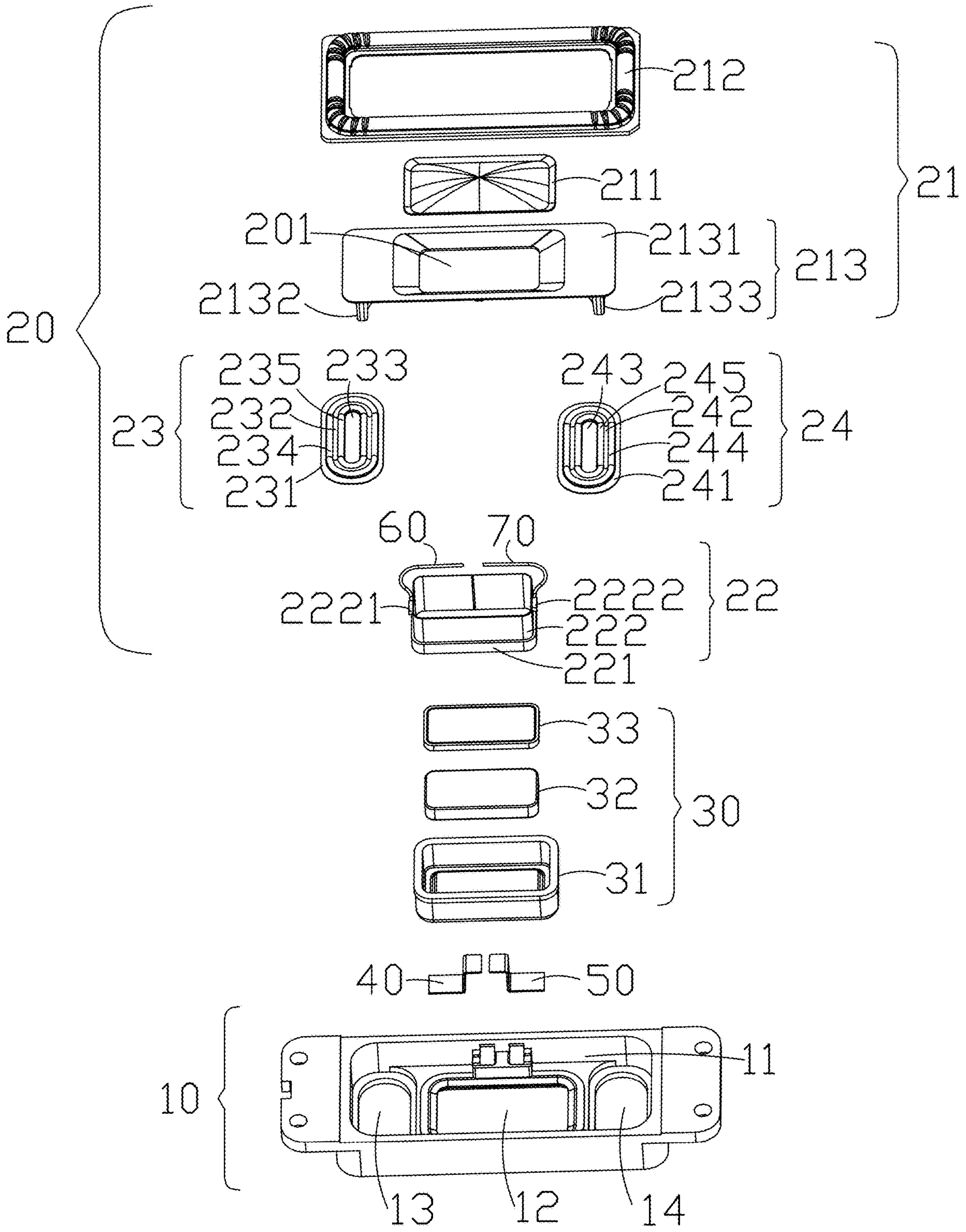
FIG. 3 is an exploded view of the speaker of the present disclosure.
Figure 4:
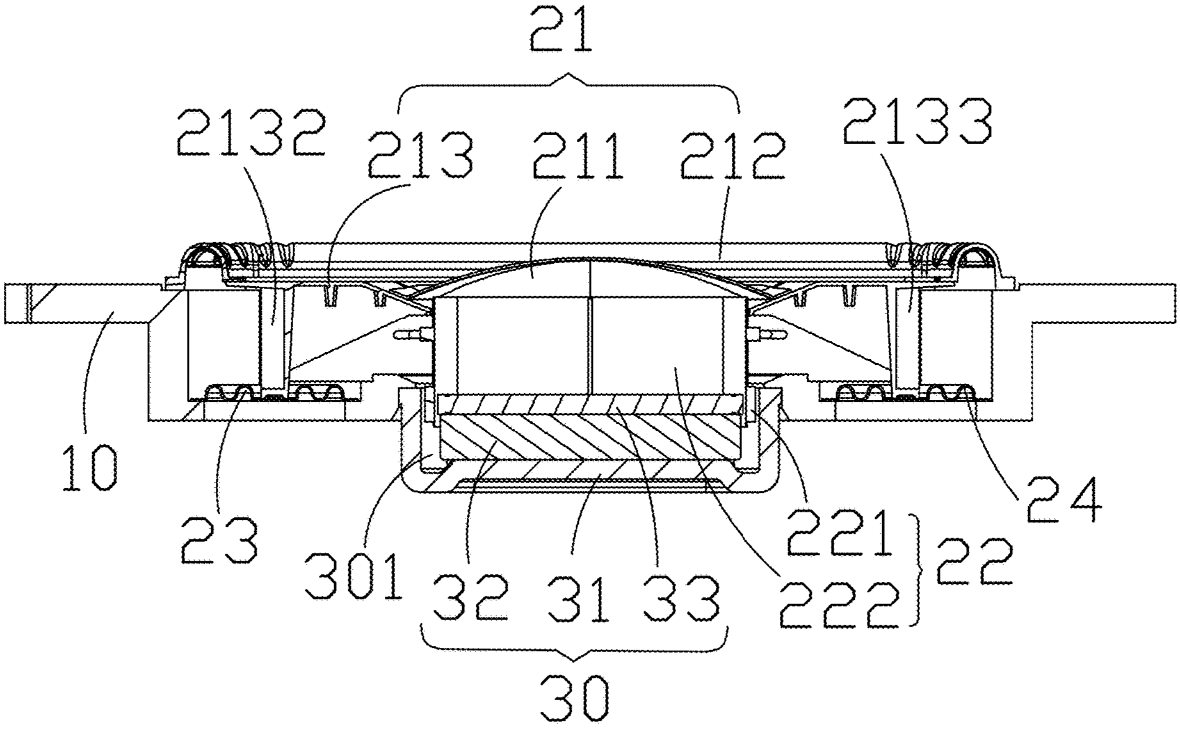
FIG. 4 is a cross-sectional view along the line A-A in FIG. 1.

As shown in the FIGS. 2-4, the diaphragm assembly 21 includes a dome 211 in a middle, a suspension 212 surrounding the dome 211 and fixed with the frame 10, and a connecting wall 213 extending from the dome 211 to the voice coil assembly 22. The connecting wall 213 is integrally formed, the connecting wall 213 includes a connecting portion 2131 connected the dome 211 to the suspension 212, and a first suspension portion 2132 and a second suspension portion 2132 located at a side away from the dome 211, the first suspension portion 2132 and the second suspension 2133 are spaced apart from each other.

As shown in the FIGS. 2-4, the vibration system 20 further includes a first elastic wave assembly 23 fixed with the frame 10 and a second elastic wave assembly 24 fixed with the frame 10 and spaced apart from the first elastic wave assembly 23. One end of the first elastic wave assembly 23 away from the frame 10 is connected with the first suspension portion 2132, one end of the second elastic wave assembly 24 away from the frame 10 is connected with the second suspension portion 2133.

In this embodiment, the first elastic wave assembly 23 and the second elastic wave assembly 24 make reasonable use of an internal space of the speaker, the height of the speaker is reduced, and thinning development is facilitated. Applying this speaker to the vehicle as an in-vehicle speaker can fulfil the parameter requirements of in-vehicle speakers for high sound quality of the horn, small size and flexible layout, low power consumption and small vibration. In addition, the first suspension portion 2132 cooperates with the first elastic wave assembly 23, and the second suspension portion 2133 cooperates with the second elastic wave assembly 24, which improve the balance of the vibration system and improve the acoustic performance of the speaker.

In some embodiments, as shown in the FIGS. 1-3, the frame 10 is arranged in a rectangular shape, therefore, the speaker is arranged in a rectangular shape. The frame 10 includes a main body 12 with a receiving cavity 11 for accommodating the magnetic circuit system 30, a first mounting portion 13 formed in the receiving cavity 11 and located at one side of the main body 12, and a second mounting portion 14 formed in the receiving cavity 11 and located at the other side of the main body 12, the first elastic wave assembly 23 is mounted on the first mounting portion 13, the second elastic wave assembly 24 is mounted on the second mounting portion 14. In this embodiment, the speaker reasonably utilizes the internal space of the speaker, has a compact layout, and thinning development is facilitated.

As shown in the FIG. 2 and FIG. 3, the first elastic wave assembly 23 and the second elastic wave assembly 24 have the same structure which are in runway shape. The first elastic wave assembly 23 includes a first elastic wave fixing portion 231, a first elastic wave edge portion 232, a second elastic fixing portion 233, a first elastic wave connection portion 234 for connecting the first elastic wave fixing portion 231 with the first elastic wave edge portion 232, and a second elastic wave connection portion 235 for connecting the first elastic wave edge portion 232 and the second elastic fixing portion 233, the first elastic fixing portion 231 is fixed with the frame 10. The second elastic fixing portion 233 is connected with the first suspension portion 2132. In one achievable embodiment, the second elastic wave assembly 24 includes a third elastic wave fixing portion 241, a second elastic wave edge portion 242, the fourth elastic fixing portion 243, a third elastic wave connection portion 244 for connecting the third elastic wave fixing portion 241 with the second elastic wave edge portion 242, and a fourth elastic wave connection portion 245 for connecting the second elastic wave edge portion 242 and the fourth elastic fixing portion 243, the third elastic fixing portion 241 is fixed with the frame 10. The fourth elastic fixing portion t 243 is connected with the second suspension portion 2133.

As shown in the FIGS. 2-4, a cross section of the first elastic connecting portion 234, the second elastic connecting portion 235, the third elastic connecting portion 244, and the fourth elastic connecting portion 245 along vibration directions are both waved. The waved elastic wave assemblies have higher vibration attenuation performance, which are conductive to improve the stability of vibration of the vibration system 20, thus improving the product performance of the speaker.

Figure 5:
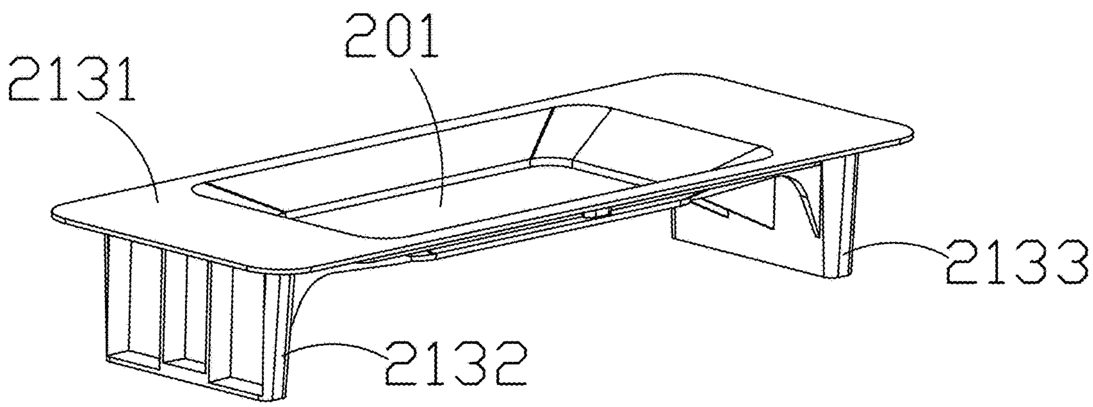
FIG. 5 is an isometric view of a first view angle of a connecting wall.
Figure 6:
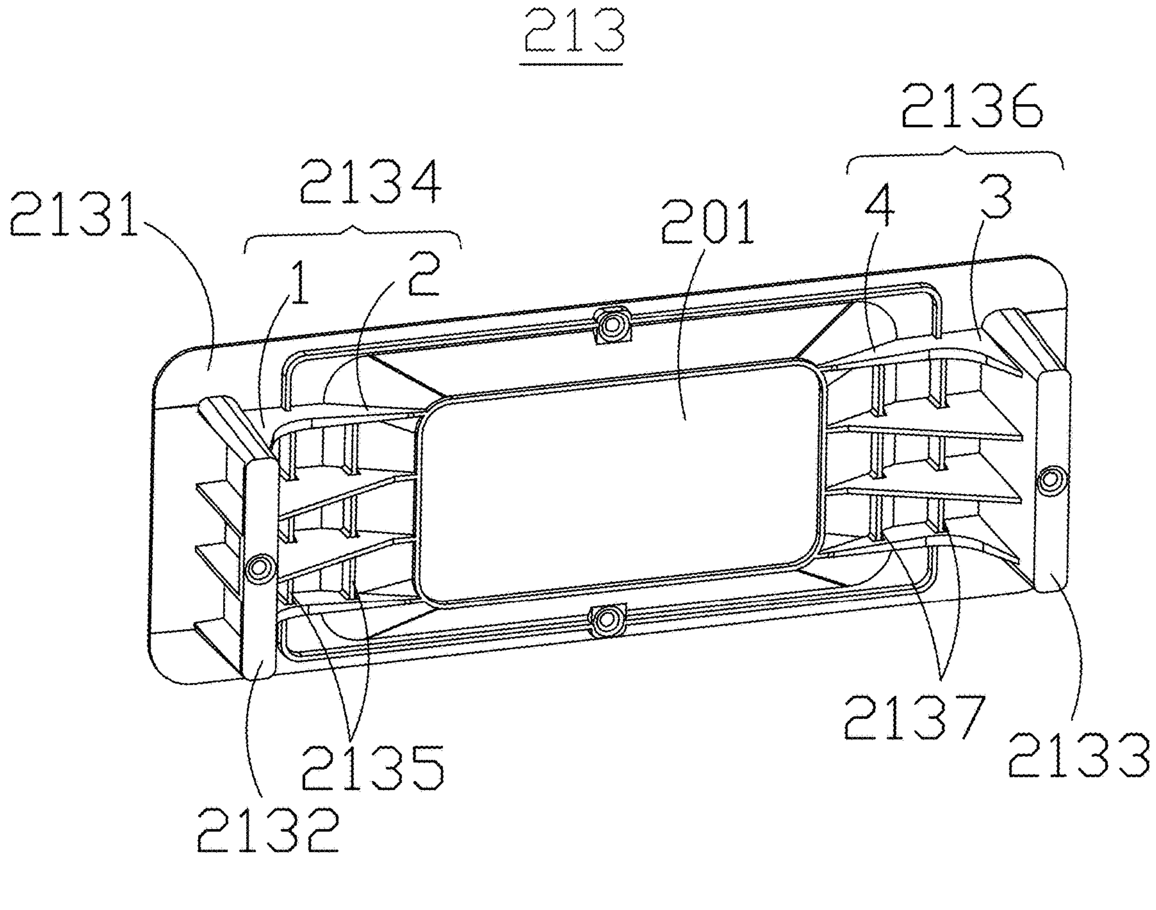
FIG. 6 is an isometric view of a second view angle of the connecting wall.

As shown in the FIG. 5 and FIG. 6, the connecting portion 2131 is provided with an opening 201 configured to the dome 211, the connecting portion 2131 is connected with the dome 211 and the opening 201 is covered by the dome 201, the first suspension portion 2132 and the second suspension portion 2132 are located symmetrically on opposite sides of the opening.

The connecting wall 213 further includes a first fixing portion 2134 connected with the connecting portion 2131 and the first suspension portion 2132, the first fixing portion 2134 includes a first vertical segment 1 extending from the connecting portion 2131 to the voice coil assembly 22 and connected with the first suspension portion 2132, and a first horizontal segment 2 extending from the first vertical segment 1 to the opening 201 and connected with the connecting portion 2031, a length of the first vertical segment 1 is different from a length of the first horizontal segment 2. There is a plurality of first fixing portions 2134, a first reinforce portion 2135 is formed between every two adjacent first fixing portions 2134.

The connecting wall 213 further comprises a second fixing portion 2136 connected with the connecting portion 2131 and the second suspension portion 2133, the second fixing portion 2136 comprises a second vertical segment 3 extending from the connecting portion 2131 to the voice coil assembly 22 and connected with the second suspension portion 2133, and a second horizontal segment 4 extending from the second vertical segment 3 to the opening 2201 and connected with the connecting portion 2131, a length of the second vertical segment 3 is different from a length of the second horizontal segment 4. There is a plurality of second fixing portions 2136, a second reinforce portion 2137 is formed between every two adjacent second fixing portions 2136.

Cross-sections of the first fixing portion 2134 and the second fixing portion 2136 may be of regular shapes or irregular shapes, and the first reinforce portion 2135 and the second reinforcing portion 2137 may be sheet-like reinforcement bars, which are capable of providing good high-frequency structural strength, thereby improving acoustic performance of the speaker.

As shown in the FIGS. 2-4, the voice coil assembly 22 includes a square voice coil 221 movably accommodated in the magnetic gap 301 and a skeleton 222 connected with the square voice coil 221 and the diaphragm assembly 21, a first outlet portion 2221 and a second outlet portion 2222 are provided on a side of the skeleton 222 away from the square voice coil 221, the first outlet portion 2221 and the second outlet portion 2222 are symmetrical. This embodiment exits the line from the upper side edge of the skeleton, which is conducive to the improvement of space utilization, and at the same time reduces the difficulty of wire management.

As shown in the FIG. 2 and FIG. 3, the speaker further includes a first external pad 40 and a second external pad 50 embedded in the frame 10 and connected to an external circuit, a first braided wire 60 connecting with the first external pad 50 and the first outlet portion 2221, and a second braided wire 70 connecting with the second external pad 50 and the second outlet portion 2222, the first braided wire 60 and the second braided wire 70 are located in the frame 10. The first braided wire 60 and the second braided wire 70 of this embodiment form a natural curvature on the upper side of the skeleton 222, which is able to ensure that the braided wire does not interfere with the square voice coil 221 and the frame 10 during movement, and at the same time, the braided wires are provided inside the frame 10, and the braided wires are guided to the outside through the external pads, so that the braided wires are not exposed to the outside, so as to improve the safety and service life of the speaker.

As shown in the FIG. 3 and FIG. 4, the magnetic circuit system 30 includes a magnetic bowl 31, a magnet 32 accommodated in the magnetic bowl 31, and a pole plate 33 attached to the magnet 32, the square voice coil 221 is movably accommodated in the magnetic gap 301 between the pole plate 33 and the magnetic bowl 31. The square voice coil 221 of this embodiment moves up and down in the magnetic gap 301 between the pole plate 33 and the magnetic bowl 31, in conjunction with the square magnetic circuit, the internal space of the speaker could be fully utilized, a higher level of magnetic energy is provided compared to a circular magnetic circuit system, therefore, the sensitivity of the speaker could be increased.

It should be appreciated by those skilled in the art that various modifications are possible without departing from the spirit or scope of the present invention. The embodiments illustrated above should not be interpreted as limits to the present invention, and the scope of the invention is to be determined by reference to the claims that follow.

What is claimed is:

1. A speaker comprising:

a frame;

a magnetic circuit system with a magnetic gap; and a vibration system fixed with the frame, comprising a diaphragm assembly, a voice coil assembly driving the diaphragm assembly to vibrate and sound, a first elastic wave assembly fixed with the frame, and a second elastic wave assembly fixed with the frame and spaced apart from the first elastic wave assembly; wherein the diaphragm assembly comprises a dome in a middle, a suspension surrounding the dome and fixed with the frame, and a connecting wall extending from the dome to the voice coil assembly, the connecting wall is integrally formed, the connecting wall comprises a connecting portion connected with the dome and the suspension, and a first suspension portion and a second suspension portion located at a side away from the dome, the first suspension portion and the second suspension portion are spaced apart from each other, one end of the first elastic wave assembly away from the frame is connected with the first suspension portion, one end of the second elastic wave assembly away from the frame is connected with the second suspension portion.

2. The speaker as described in claim 1, wherein the connecting portion is provided with an opening, the connecting portion is connected with the dome and the opening is covered by the dome, the first suspension portion and the second suspension portion are located symmetrically on opposite sides of the opening, respectively.

3. The speaker as described in claim 2, wherein the connecting wall further comprises a first fixing portion connected with the connecting portion and the first suspension portion, the first fixing portion comprises a first vertical segment extending from the connecting portion to the voice coil assembly and connected with the first suspension portion, and a first horizontal segment extending from the first vertical segment to the opening and connected with the connecting portion, a length of the first vertical segment is different from a length of the first horizontal segment.

4. The speaker as described in claim 3, wherein there is a plurality of first fixing portions, a first reinforce portion is formed between every two adjacent first fixing portions.

5. The speaker as described in claim 2, wherein the connecting wall further comprises a second fixing portion connected with the connecting portion and the second suspension portion, the second fixing portion comprises a second vertical segment extending from the connecting portion to the voice coil assembly and connected with the second suspension portion, and a second horizontal segment extending from the second vertical segment to the opening and connected with the connecting portion, a length of the second vertical segment is different from a length of the second horizontal segment.

6. The speaker as described in claim 5, wherein there is a plurality of second fixing portions, a second reinforce portion is formed between every two adjacent second fixing portions.

7. The speaker as described in claim 1, wherein the voice coil assembly comprises a square voice coil movably accommodated in the magnetic gap and a skeleton connected with the square voice coil and the diaphragm assembly, a first outlet portion and a second outlet portion are provided on a side of the skeleton away from the square voice coil, the first outlet portion and the second outlet portion are symmetrical.

8. The speaker as described in claim 7, wherein further comprises a first external pad and a second external pad embedded in the frame and connected with an external circuit, a first braided wire connected with the first external pad and the first outlet portion, and a second braided wire connected with the second external pad and the second outlet portion, the first braided wire and the second braided wire are located in the frame.

9. The speaker as described in claim 7, wherein the magnetic circuit system comprises a magnetic bowl, a magnet accommodated in the magnetic bowl, and a pole plate attached to the magnet, the square voice coil is movably accommodated in the magnetic gap between the pole plate and the magnetic bowl.

10. The speaker as described in claim 1, wherein the frame is arranged in a rectangular shape, the frame comprises a main body with a receiving cavity for accommodating the magnetic circuit system, a first mounting portion formed in the receiving cavity and located at one side of the main body, and a second mounting portion formed in the receiving cavity and located on the other side of the main body, the first elastic wave assembly is mounted on the first mounting portion, the second elastic wave assembly is mounted on the second mounting portion.

* * * * *